United States Patent [19]
Paul et al.

[11] Patent Number: 5,990,039
[45] Date of Patent: *Nov. 23, 1999

[54] METAL COMPLEX DERIVED CATALYST AND METHOD OF FORMING

[75] Inventors: Partha P Paul; Stuart T Schwab, both of San Antonio, Tex.

[73] Assignee: Southwest Research Institute, San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/780,708

[22] Filed: Jan. 8, 1997

Related U.S. Application Data

[60] Provisional application No. 60/009,765, Jan. 11, 1996.

[51] Int. Cl.$^6$ .................................................... B01J 23/40
[52] U.S. Cl. ........................... 502/326; 502/66; 502/338; 502/339; 502/345
[58] Field of Search ................................. 502/63, 64, 66, 502/326, 338, 339, 345

[56] References Cited

U.S. PATENT DOCUMENTS

| | | | |
|---|---|---|---|
| 4,234,455 | 11/1980 | Homeier et al. | 252/430 |
| 4,290,916 | 9/1981 | Carlson | 252/430 |
| 4,388,285 | 6/1983 | Rankel et al. | 423/329 |
| 4,751,068 | 6/1988 | Bickar et al. | 423/437 |
| 4,970,188 | 11/1990 | Steinbach et al. | 502/163 |
| 4,980,335 | 12/1990 | Sugo et al. | 502/402 |
| 5,041,270 | 8/1991 | Fujitani et al. | 423/213.2 |
| 5,057,296 | 10/1991 | Beck | 423/277 |
| 5,098,684 | 3/1992 | Kresge et al. | 423/277 |
| 5,102,643 | 4/1992 | Kresge et al. | 423/328 |
| 5,108,725 | 4/1992 | Beck et al. | 423/263 |
| 5,126,297 | 6/1992 | Hardison et al. | 502/62 |
| 5,128,302 | 7/1992 | Steinbach et al. | 502/241 |
| 5,164,351 | 11/1992 | Steinbach et al. | 502/74 |
| 5,167,942 | 12/1992 | Balkus et al. | 423/705 |
| 5,264,203 | 11/1993 | Beck et al. | 423/703 |
| 5,362,695 | 11/1994 | Beck et al. | 502/62 |

FOREIGN PATENT DOCUMENTS 9111390  8/1991  WIPO .

OTHER PUBLICATIONS

J.S. Beck, J.C. Vartuli, W.J.Roth, M.E. Leonowicz, C.T. Kresge, K.D. Schmitt, C.T–W Chu, D.H. Olson, E.W. Sheppard, S.B. McCullen, J.B. Higgins and J.L. Schlenker; "A New Family of Mesoporous Molecular Sieves Prepared with Liquid Crystal Templates," *Journal of the American Chemical Society*; 1992, vol. 114, pp. 10834–10843. No month.

*Primary Examiner*—John F. Niebling
*Assistant Examiner*—Alexander G. Ghyka
*Attorney, Agent, or Firm*—Jenkens & Gilchrist

[57] ABSTRACT

A hydrocarbon-independent lean-burn $NO_x$ catalyst for treatment of products of combustion includes a porous support impregnated with two transition metals. The first transition metal has a stable upper oxidation state that is reducible to a lower oxidation state in the presence of carbon monoxide which is oxidized in the presence of the first transition metal to form carbon dioxide. The second transition metal has a stable lower oxidation state and is capable of being raised to a higher oxidation state in the presence of $NO_x$ which is reduced to nitrogen and oxygen in the presence of the second metal. The first and second metals cooperate to form a redox reaction system which regenerates the active form of the catalyst by raising the first metal to its stable oxidation state and reducing the second metal to it stable lower oxidation state by electron transfer between the first and second metals. The catalyst is based on transition metals which are less expensive than the noble metal-containing catalysts in current use.

23 Claims, 1 Drawing Sheet

METAL COMPLEX DERIVED CATALYST AND METHOD OF FORMING

This Appln claims benefit of Provisional Appln NO. 60/009,765 Jan. 1, 1996.

BACKGROUND OF THE INVENTION

1. Technical Field

This invention relates generally to a catalyst for treating products of combustion, and more particularly to such a catalyst that both reduces various oxides of nitrogen ($NO_x$) and oxidizes carbon monoxide (CO) components of gaseous products of combustion.

2. Background Art

Atmospheric $NO_x$, which primarily consists of nitric oxide (NO) and nitrogen dioxide ($NO_2$), results in air pollution as well as the production of acid rain and urban smog. More specifically, nitrogen dioxide is linked as a causative agent in bronchitis, pneumonia and alteration of the immune system in humans. $NO_x$ also participates in the formation of ground-level ozone in the presence of sunlight. Industrial and other combustion processes, e.g., internal combustion engines, produce large amounts of $NO_x$, which is a severe threat to the environment.

About one-half of all man-made $NO_x$ can be attributed to automobile engine emissions. Recently enacted federal and state regulations impose stringent restrictions on auto engine emissions. Future regulations now being proposed will place even tighter restrictions on engine emissions.

Conventionally, noble metals such as platinum and rhodium, supported on alumina, are used for controlling auto engine emissions. The performance of noble metal based catalysts is generally improved by increasing the loading of the noble metal, which is very expensive. A vanadium-based catalyst is now being used in power plants, but poses an environmental threat due to the production of volatile vanadium compounds. More recently, the use of ammonia ($NH_3$) has been demonstrated as the reducing agent in selective catalytic reduction (SCR) of $NO_x$, but use of ammonia in a mobile system may not be feasible. The use of metal substituted zeolites as candidates for $NO_x$ reduction has also been proposed. It has been found that excessively ion exchanged copper zeolites can reduce 80% of NO to nitrogen, but the decomposition is inhibited in the presence of high concentrations of oxygen such as that typically present under "lean burn" conditions required for optimum fuel economy in automobile engines. It is also known that catalysts comprised of copper zeolites, in the presence of hydrocarbons, can reduce NO under oxygen-rich conditions. In this arrangement, gasoline has been introduced, as the hydrocarbon source, into the exhaust gas mixture to optimize the performance of the catalyst. This practice reduces overall fuel economy. Catalysts in current use based on platinum or rhodium are costly, do not work under lean-burn conditions, and will not be able to meet future emission standards.

The present invention is directed to overcoming the problems set forth above. It is desirable to have a catalyst system that is economical to produce and is capable of effectively treating $NO_x$ emissions in automotive exhaust systems. It is also desirable to have such a catalyst system that does not require the use of platinum or rhodium or other rare metals. Furthermore, it is desirable to have an inexpensive catalyst that, under lean burn conditions, not only reduces $NO_x$ but also oxidizes carbon monoxide and hydrocarbons. Still further, it is desirable to have such a catalyst that reduces $NO_x$ under oxygen-rich conditions and is not dependent on hydrocarbon for its activity.

SUMMARY OF THE INVENTION

In accordance with one aspect of the present invention, a catalyst for treatment of the products of combustion comprises a porous support impregnated with two transition metals, the first of which has a stable upper oxidation state and is reducible to a lower oxidation state in the presence of carbon monoxide which is oxidized in the presence of the first metal to form carbon dioxide, and the second of which has a stable lower oxidation state and is capable of being raised to a higher oxidation state in the presence of $NO_x$ which is reduced to nitrogen and oxygen in the presence of the second metal. The first and second metals cooperate to form a redox reaction system which regenerates the active form of the catalyst by raising the first metal to its stable upper oxidation state and reducing the second metal to its stable lower oxidation state by electron transfer between the first and second metals.

Other features of the catalyst embodying the present invention include the porous solid being formed of a material in the group consisting of natural or synthetic polymers, glass, gels, charcoal, ceramic materials, metal oxides, mixed metal oxides, silica, silicates including aluminosilicate, alumina and alumina compounds, zeolite and other molecular sieves, layered clays and modified layered materials such as pillared clays, and other porous materials. Other features include the first transition metal being selected from the group consisting of palladium, rhenium, osmium, ruthenium, rhodium, iridium and gold and partially supported on the solid support, and the second transition metal being a metal-ligand complex held on the solid support, wherein the metal-ligand complex comprises a ligand, macrocyclic or otherwise, which binds one or more metal atoms selected from the group consisting of copper, iron, cobalt, scandium, titanium, zirconium, hafnium, vanadium, niobium, tantalum, chromium, molybdenum, tungsten, manganese, platinum, nickel, silver, indium, lead and tin.

In accordance with another aspect of the present invention, a method for forming a catalyst includes providing a porous support, impregnating the porous support with ions of a first transition metal having a stable upper oxidation state and is reducible to a lower oxidation state in the presence of carbon monoxide. The porous support is further impregnated with ions of a second transition metal having a stable lower oxidation state and is capable of being raised to a higher oxidation state in the presence of $NO_x$.

Other features of the method of forming a catalyst in accordance with the present invention include impregnating the porous support with ions of the second transition metal by encapsulating organic molecules complexed with ions of the low oxidation state transition metal within the pores of a partially exchanged molecular sieve. Still other features include the impregnating of the porous support being carried out by further exchanging a portion of the ions in the molecular sieve with ions of the higher oxidation state transition metal. The upper and lower oxidation state transition metals cooperate, in the presence of carbon monoxide and $NO_x$, to form a redox system wherein the active form of the catalyst is regenerated, carbon monoxide is oxidized by the first transition metal, and $NO_x$ is reduced by the second transition metal.

DETAILED DESCRIPTION OF THE INVENTION

The catalyst embodying the present invention is a couple between two catalytic cycles, one reducing and one oxidizing. As illustrated by the left portion of the diagram in FIG. 1, a first transition metal m has a stable upper oxidation state $m^{n+2}$ that is reduced to a lower oxidation state $m^n$ in the presence of carbon monoxide (CO). Suitable metals for use as the first transition metal m include palladium, rhenium, osmium, ruthenium, rhodium, iridium and gold, all of which have a stable $^{n+2}$ upper oxidation state, where $n$ has a value of 0 or above. The transition metals having an $^{n+2}$ upper oxidation state have the ability to react with carbon monoxide, a toxic component of combustion product gases, to produce carbon dioxide ($CO_2$), an environmentally benign gas. In the preferred embodiment of the present invention, palladium is the preferred metal due to its lack of reactivity with $NO_x$ and oxygen, and its relatively low cost. In vehicular applications, the amount of CO generated during operation varies from engine to engine and depends on the operating mode. Internal combustion engine exhaust gases typically contain about 84 g of carbon monoxide per vehicle operating mile. Thus, as a result of the reaction between CO and the higher oxidation state ion $^{n+2}$ of the first transition metal m, the upper oxidation state $^{n+2}$ is reduced to the lower oxidation state $m^n$, and carbon monoxide is simultaneously oxidized to form carbon dioxide.

Figure 1:
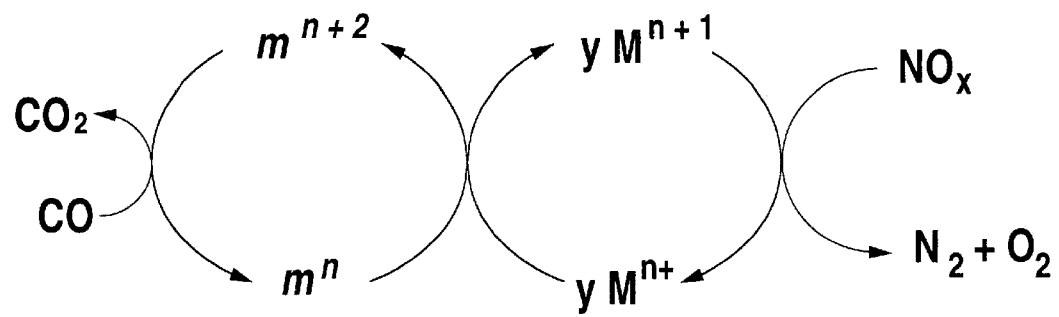
FIG. 1 is a schematic diagram of the bimetallic catalytic cycle embodying the present invention.

The second catalytic cycle is shown in the right portion of the diagram in FIG. 1. A second transition metal M has a stable lower oxidation state $M^{n+}$ that is capable of being raised to an upper oxidation state $M^{n+1}$ in the presence of $NO_x$. Suitable metals for use as the second transition metal M include copper, iron, cobalt, scandium, titanium, zirconium, hafnium, vanadium, niobium, tantalum, chromium, molybdenum, tungsten, manganese, platinum, nickel, silver, indium, lead and tin. Preferably, as explained below in greater detail, complexes of copper(I), iron (II) or cobalt (II), with ligands, are encapsulated within pores of the catalyst. As a result of the reaction between lower oxidation state metal $M^{n+}$ of the second transition metal with $NO_x$, the lower oxidation state $^{n+}$ is raised to the upper oxidation state $M^{n+1}$, and $NO_x$ is reduced to $N_2$.

Importantly, as noted above, the active form of the catalyst is regenerated by a redox reaction between the first transition metal m and the second transition metal M. In the diagram shown in FIG. 1, the letter y represents the number of molecules of the second metal M required to support the redox reaction between the two cycles. The redox reaction takes place by way of outer-sphere electron transfer between the two metals m and M. By way of example, if palladium (Pd) is selected as the first transition metal m, and iron (Fe) as the second transition metal M, the upper oxidation state representation of palladium is $Pd^{II}$, and the lower state $Pd^0$, or simply Pd. The lower oxidation state of iron is represented as $Fe^{II}$, and the upper state as $Fe^{III}$. Thus, y must have a value of 2 to balance the outer-sphere electron transfer that occurs during the redox reaction between the two metals, i.e., each atom of palladium gains two electrons when raised to its stable upper oxidation state while each atom of iron loses only one electron when reduced to its stable lower oxidation state. In a similar manner, the lower oxidation states of copper and cobalt may be represented as $Cu^I$ and $Co^{II}$, respectively, and their respective upper oxidation states as $Cu^{II}$ and $Co^{III}$ with a similar redox reaction occurring between the respective metals and palladium.

Figure 2:
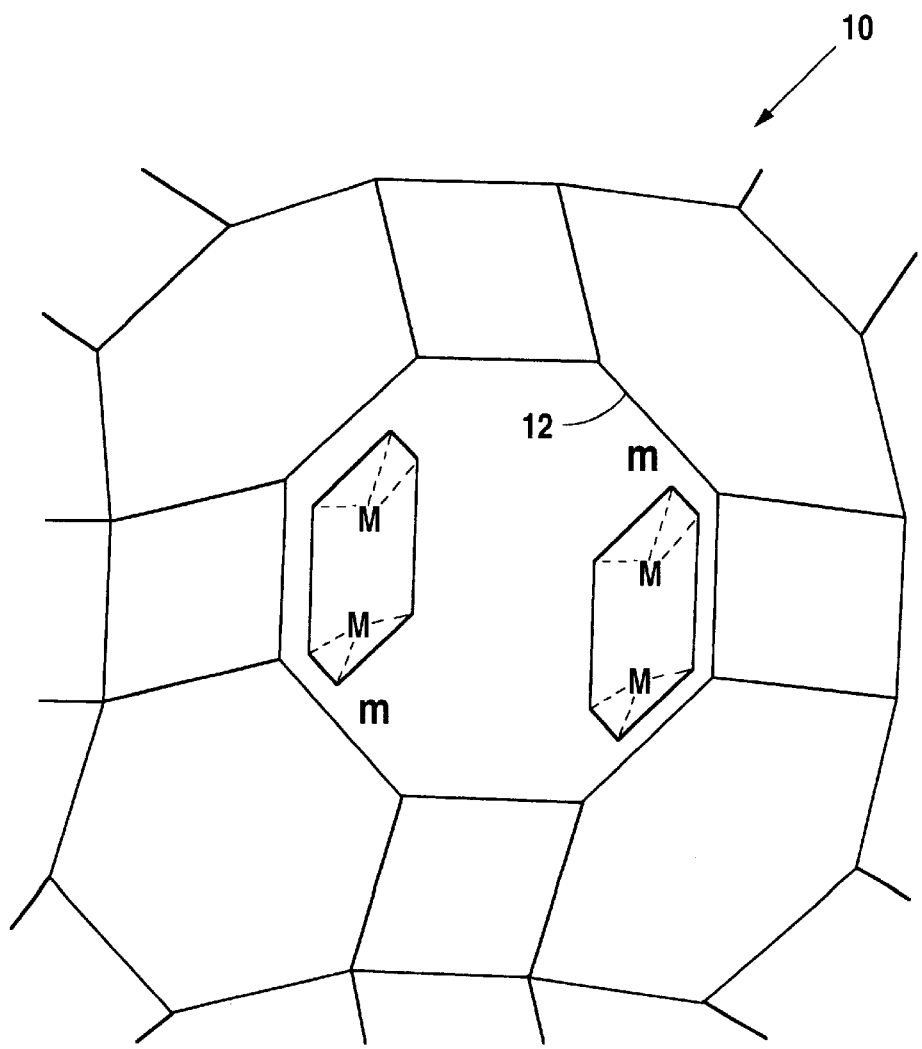
FIG. 2 is a schematic diagram of a metal ion exchanged catalyst embodying the present invention, with metal complex ions encapsulated within the pores of the porous support structure.

As illustrated in FIG. 2, the catalyst embodying the present invention is formed by impregnating a porous structure 10, such as a zeolite molecular sieve, with ions of the two transition metals m and M. Porous materials are typically amorphous or polycrystalline solids, such as natural or synthetic polymers, glass, gels, charcoal, ceramic materials, metal oxides, mixed metal oxides, silica, silicates including aluminosilicate, alumina and alumina compounds, zeolite and other molecular sieves, layered clays and modified layered materials such as pillared clays, and other porous materials. The pores in these materials are generally regularly spaced and uniform in size, thereby providing a beneficial structure for use as a support structure for the catalyst embodying the present invention. Molecular sieves, such as aluminosilicate and zeolite in particular, provide a beneficial support structure. In the preferred embodiment, the low oxidation state catalyst $M^+$ is incorporated in the pores of a zeolite as large metal complexes of M in which one or more metal ions are bound by nitrogen and sulfur/oxygen donor atoms of organic ligands. These ligands may be macrocyclic, or otherwise, and also may be monodentate, bidentate or polydentate in their attachment with the second transition metal ions. The metal-ligand complexes are represented by the polygon-shaped structures in FIG. 2, which are situated inside a representative pore 12 of the support structure 10. The upper oxidation state metal m is likewise present inside the pore 12. The respective metal atoms M,m are held inside the pore 12 by ionic interactions.

Mesoporous materials having a pore size of up to about 100 Å were synthesized in accordance with known methods. The mesoporous materials were then ion exchanged with a variety of the lower oxidation state metal ions M, such as copper, iron and cobalt. As described above, other lower oxidation state metal ions M believed to be suitable for use in the catalyst embodying the present invention include scandium, titanium, zirconium, hafnium, vanadium, niobium, tantalum, chromium, molybdenum, tungsten, manganese, platinum, nickel, silver, indium, lead and tin. Organic molecules, or ligands, containing nitrogen, oxygen and sulfur donor atoms were synthesized in situ and reacted with the ion exchanged mesoporous materials to produce metal complex impregnated mesoporous materials. The metal complex impregnated mesoporous materials were then further ion exchanged with an upper oxidation state metal m, palladium, to produce the catalyst. Also, as described above, other metals believed to be suitable for use as the upper oxidation component m of the redox catalyst system embodying the present invention include rhenium, osmium, ruthenium, rhodium, iridium and gold.

By way of a first example, a molecular support for ions of two transition metals was prepared as described in *A New Family of Mesoporous Molecular Sieves Prepared with Liquid Crystal Templates*, J. S. Beck et al, Journal of the American Chemical Society, 1992, pp 10834–10843. Ions in the thus-prepared mesoporous molecular sieve, described as MCM-41 in the above paper, were then exchanged with copper ions by dissolving 1.7 g of $[Cu(CH_3CN)_4]PF_6$ in 150 mL of acetonitrile and adding that solution to the mesoporous material. The mixture was refluxed for 18 hours, after which the solid was isolated and the residual $[Cu(CH_3CN)_4]PF_6$ removed by soxhlet extraction with $CH_3CN$. The resultant Cu(I)-exchanged molecular sieve was dried under vacuum.

A copper complex impregnated molecular sieve was then obtained by adding the above-prepared Cu(I) exchanged mesoporous molecular sieve to a solution of ligand prepared in situ. A solution of 1.15 g of 2,6 diacetylpyridine in acetonitrile was added to an acetonitrile solution of 0.7 g of Tris(2-aminoethyl amine) to produce the ligand. A Cu(I)-ligand complex was achieved by stirring the mixture for about 18 hours at room temperature.

Further, in the first illustrative example, a saturated solution of NaCl in 150 mL of methanol was added to the above Cu(I) complex molecular sieve and stirred overnight. The solid was washed with 2×30 mL of methanol and dried in a vacuum, after which 0.3 g of $Pd(NH_3)_4Cl_2$ was added, followed by the addition of 60 mL of N,N-dimethyl formamide. Other suitable sources of $Pd^{2+}$ include $Pd(CH_3COO)_2$ and $PdCl_2$. The above mixture was heated at 70–80° C. for about 16 hours and then washed with 2×30 mL of DMF (N,N-dimethyl formamide). The residual impurities were removed by soxhlet extraction, followed by vacuum drying, thereby producing a catalyst having palladium ions and copper metal complex ions bonded to the molecular sieves.

In a second, preferred example, a catalyst embodying the present invention was formed in which palladium and iron were the respective first and second transition metals m, M. A mesoporous support for ions of the two transition metals was again formed in accordance with the above-described method of J. S. Beck et al. The support thus formed provided a mesoporous molecular sieve having a pore size of about 35 Å. A portion of the ions in the molecular sieve were exchanged with iron ions by dissolving 2.2 g of $FeSO_4$ in 300 mL of deaerated, deionized water, thereby producing a faint green solution. To this solution 10 g of the above-described molecular sieve was added, and the mixture refluxed for about 18–20 hours, producing an off-white solid. The solid was washed with 3×200 mL of deaerated, deionized water, and then heated to 100° C. under vacuum for 20 hours to obtain an $Fe^{II}$ partially exchanged mesoporous molecular sieve.

An $Fe^{II}$-complex impregnated molecular sieve was then formed by first adding a 25 mL solution of 2.6 diacetyl pyridine (1.14 g, 6.99 mmol) in acetonitrile, dropwise over a period of about 1 hour, to a solution of tris(2-aminoethyl) amine (0.7 mL, 4.70 mmol) in 25 mL of acetonitrile. A pale yellow solution resulted, to which 5 g of the previously formed $Fe^{II}$-partially exchanged molecular sieve was added. The off-white molecular sieves turned to an indigo color in about 20 minutes, which was further stirred for 16 hours. The solid was washed several times with $CH_3CN$ prior to soxhlet extraction of the soluble impurities, and then dried under vacuum.

The last step in this example of the formation of a catalyst embodying the present invention includes impregnating ions of the second transition metal M in the above-described $Fe^{II}$-complex impregnated molecular sieve. This was carried out by adding 5 g of the $Fe^{II}$-complex impregnated molecular sieve to a solution of $[Pd(NH_3)_4]Cl_2$ (0.3 g, 1.22 mmol) in 60 mL DMF. The mixture was stirred at 70° C. for about 16 hours. The solid was then filtered and washed with 2×30 mL of DMF, followed by soxhlet extraction of the soluble impurities. The above-described process produced a catalyst, having a black-blue color, with ions of the first and second transition metals m, M (iron and palladium) impregnated within the pores of the porous support.

The redox catalytic system takes advantage of the presence of CO in the combustion product stream, and does not require additional hydrocarbon, such as provided by gasoline or other fuel, to drive the catalytic reaction. More specifically, it is believed that the following reactions occur during the catalytic process when engine exhaust gas passes through the above-described $Fe^{II}$-$Pd^0$ catalyst:

$$2Pd^{II}+2CO+2H_2O \rightarrow 2Pd^0+2CO_2+4H^+ \quad (1)$$

$$2Fe^{II}+NO \rightarrow Fe_2^{III}(N_2O_2^{2-}) \quad (2)$$

$$Fe_2^{III}(N_2O_2^{2-})+2Fe^{II}+4H^+ \rightarrow 4Fe^{III}+N_2+2H_2O \quad (3)$$

$$4Fe^{III}+2Pd^0 \rightarrow 4Fe^{II}+2Pd^{II} \quad (4)$$

Catalysts embodying the present invention and formed by the above-described methods further embodying the present invention, have been tested with both simulated and actual engine exhaust gases. The simulated exhaust gas tests demonstrated that the catalysts embodying the present invention converted nitric oxide to nitrogen in the presence of oxygen, and simultaneously oxidized carbon monoxide to carbon dioxide. In the tests with exhaust gas generated by a gasoline engine, the catalysts embodying the present invention showed $NO_x$ reduction under lean burn conditions and high oxidation of carbon monoxide and hydrocarbons. Importantly, the catalyst system embodying the present invention does not require any added reducing agents, such as hydrocarbon fuels, for its activity. Also, it should be noted that, because of the above attributes, the catalyst embodying the present invention is suitable not only for internal combustion engines, such as gasoline-fueled or diesel-fueled engines, but also for open combustion devices such as sterling cycle engines, boilers, furnaces and other combustion-product producing devices. Thus, the term "products of combustion" as used herein and in the claims is applicable to all such combustion-product producing devices.

Although the present invention is described in terms of illustrative examples and embodiments, those skilled in the art will recognize that changes in the illustrative examples may be made without departing from the spirit of the invention. Such changes are intended to fall within the scope of the invention. Other aspects, features and advantages of the present invention can be obtained by a study of the schematic drawings and this disclosure.

What is claimed is:

1. A catalyst for treatment of products of combustion, comprising a porous support having first and second transition metals impregnated within the pores of said support with both transition metals being present in common pores of said porous support, said first transition metal having a stable upper oxidation state and being reducible to a lower oxidation state in the presence of carbon monoxide which is oxidized in the presence of said first transition metal to form carbon dioxide and raised to the stable upper oxidation state by electron transfer to the second transition metal, and said second transition metal having a stable lower oxidation state and being capable of being raised to a higher oxidation state in the presence of $NO_x$ which is reduced to nitrogen and oxygen in the presence of said second transition metal, and reduced to said stable lower oxidation state by electron transfer from the first transition metal, and said second transition metal being a metal-ligand complex wherein the ligand is capable of binding at least one ion of the second transition metal.

2. A catalyst, as set forth in claim 1, wherein said porous support is formed of a material selected from the group consisting of natural or synthetic polymers, glass, gels, charcoal, ceramic materials, metal oxides, mixed metal oxides, silica, silicates, aluminosilicate, alumina, aluminum compounds, zeolite, molecular sieves, layered clays, modified layered materials, and pillared clays.

3. A catalyst, as set forth in claim 2, wherein said porous support is zeolite.

4. A catalyst, as set forth in claim 2, wherein said porous support is a mesoporous molecular sieve formed of aluminosilicate.

5. A catalyst, as set forth in claim 1, wherein said first transition metal is selected from the group consisting of palladium, rhenium, osmium, ruthenium, rhodium, iridium, and gold.

6. A catalyst, as set forth in claim 5, wherein said first transition metal is palladium.

7. A catalyst, as set forth in claim 1, wherein said second transition metal is selected from the group consisting of copper, iron, cobalt, scandium, titanium, zirconium, hafnium, vanadium, niobium, tantalum, chromium, molybdenum, tungsten, manganese, platinum, nickel, silver, indium, lead, and tin.

8. A catalyst, as set forth in claim 7, wherein said second transition metal is iron.

9. A catalyst, as set forth in claim 7, wherein said second transition metal is copper.

10. A catalyst, as set forth in claim 1, wherein said metal-ligand complex is a macrocyclic ligand.

11. A catalyst, as set forth in claim 1, wherein said catalyst is capable of reducing $NO_x$ in the products of combustion under lean burn, oxygen rich conditions.

12. A catalyst, as set forth in claim 1, wherein said catalyst reduces $NO_x$ and oxidizes carbon monoxide in the products of combustion without dependence on the presence of hydrocarbon in said products of combustion.

13. A method for forming a catalyst, comprising:
   providing a porous support;
   impregnating said porous support with ions of a first transition metal having a stable upper oxidation state and is reducible to a lower oxidation state in the presence of carbon monoxide subsequent to;
   impregnating said porous support with ions of a second transition metal having a stable lower oxidation state and is capable of being raised to a higher oxidation state in the presence of $NO_x$, by at least partially exchanging ions in said porous support with ions of said second transition metal and subsequently synthesizing, in situ, ligands complexed with said second transition metal, thereby forming a porous support having said first and second transition metals present in common pores of said porous support.

14. A method for forming a catalyst, as set forth in claim 13, wherein said porous support is formed of a material selected from the group consisting of natural or synthetic polymers, glass, gels, charcoal, ceramic materials, metal oxides, mixed metal oxides, silica, silicates, aluminosilicate, alumina, aluminum compounds, zeolite, molecular sieves, layered clays, modified layered materials, and pillared clays.

15. A method for forming a catalyst, as set forth in claim 14, wherein said porous support is zeolite.

16. A method for forming a catalyst, as set forth in claim 14, wherein said porous support is a mesoporous molecular sieve formed of aluminosilicate.

17. A method for forming a catalyst, as set forth in claim 13, wherein said first transition metal is selected from the group consisting of palladium, rhenium, osmium, ruthenium, rhodium, iridium, and gold.

18. A method for forming a catalyst, as set forth in claim 17, wherein said first transition metal is palladium.

19. A method for forming a catalyst, as set forth in claim 13, wherein said second transition metal is selected from the group consisting of copper, iron, cobalt, scandium, titanium, zirconium, hafnium, vanadium, niobium, tantalum, chromium, molybdenum, tungsten, manganese, platinum, nickel, silver, indium, lead, and tin.

20. A method for forming a catalyst, as set forth in claim 19, wherein said second transition metal is iron.

21. A method for forming a catalyst, as set forth in claim 19, wherein said second transition metal is copper.

22. A method for forming a catalyst, as set forth in claim 13, wherein second transition metal is a metal-ligand complex wherein the ligand is capable of binding at least one ion of said second transition metal.

23. A catalyst, as set forth in claim 22, wherein said metal-ligand complex is a macrocyclic ligand.

* * * * *

UNITED STATES PATENT AND TRADEMARK OFFICE
CERTIFICATE OF CORRECTION

PATENT NO.    : 5,990,039
DATED         : November 23, 1999
INVENTOR(S)   : Partha P. Paul and Stuart T. Schwab It is certified that error appears in the above-identified patent and that said Letters Patent is hereby corrected as shown below:

Drawings,
Figure 1, the arrows for $yM^{n+1}$ and $yM^{n+}$ are going in the wrong direction. Fig. 1 should appear as follows:

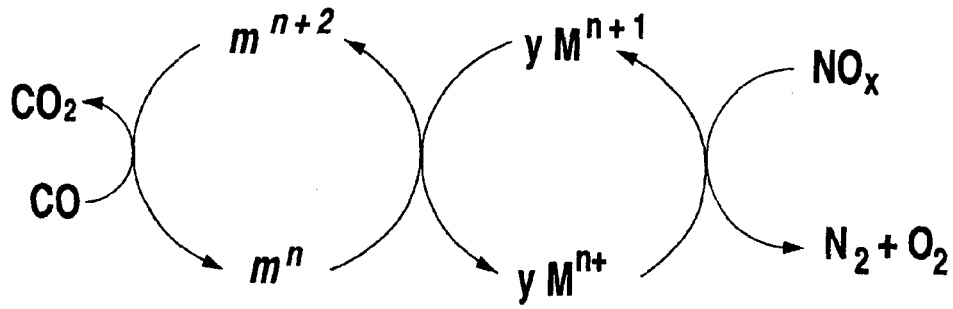

Fig. 1

Signed and Sealed this

Twenty-first Day of October, 2003

JAMES E. ROGAN
*Director of the United States Patent and Trademark Office*